(12) United States Patent
Boyle et al.

(10) Patent No.: US 8,918,883 B1
(45) Date of Patent: Dec. 23, 2014

(54) PRIORITIZING NETWORK SECURITY VULNERABILITIES USING ACCESSIBILITY

(75) Inventors: Joe B. Boyle, San Francisco, CA (US); Mark Wittenberg, Walnut Creek, CA (US); Yves Perrenoud, San Francisco, CA (US); Timothy D. Keanini, Austin, TX (US)

(73) Assignee: Tripwire, Inc., Portland, OR (US)

( * ) Notice: Subject to any disclaimer, the term of this patent is extended or adjusted under 35 U.S.C. 154(b) by 1510 days.

(21) Appl. No.: 11/424,088

(22) Filed: Jun. 14, 2006

Related U.S. Application Data

(60) Provisional application No. 60/691,343, filed on Jun. 15, 2005.

(51) Int. Cl.
*G06F 12/14* (2006.01)

(52) U.S. Cl.
USPC ............................................................. 726/25

(58) Field of Classification Search
USPC .................................................. 726/25, 11
See application file for complete search history.

(56) References Cited

U.S. PATENT DOCUMENTS

| | | | |
|---|---|---|---|
| 7,926,113 B1* | 4/2011 | Gula et al. ........................ | 726/25 |
| 2002/0026591 A1* | 2/2002 | Hartley et al. ................. | 713/201 |
| 2004/0015728 A1* | 1/2004 | Cole et al. ....................... | 713/201 |
| 2005/0138413 A1* | 6/2005 | Lippmann et al. ............. | 713/201 |
| 2005/0193430 A1* | 9/2005 | Cohen et al. .................... | 726/25 |

\* cited by examiner

*Primary Examiner* — Ellen Tran
(74) *Attorney, Agent, or Firm* — Klarquist Sparkman, LLP

(57) ABSTRACT

An enterprise network includes hosts running services. Some of the services have security vulnerabilities. There are one or more threat zones associated with the network. For example, a firewall may create two threat zones, one internal to the firewall and one external to it. A device profiler in the first threat zone profiles the hosts on the network and identifies the vulnerabilities that are present. A device profiler in the second threat zone determines which of the identified vulnerabilities are accessible from its zone. A risk module calculates the risk associated with a vulnerability based on the vulnerability's severity, threat level metrics for the threat zones, and an asset value of the host with the vulnerability. A reporting module prioritizes the vulnerabilities based on their risks.

21 Claims, 6 Drawing Sheets

PRIORITIZING NETWORK SECURITY VULNERABILITIES USING ACCESSIBILITY

CROSS-REFERENCE TO RELATED APPLICATION

This application claims the benefit of U.S. Provisional Application No. 60/691,343, filed Jun. 15, 2005, which is hereby incorporated by reference herein.

BACKGROUND OF THE INVENTION

1. Field of the Invention

This invention pertains in general to network security and in particular to prioritizing vulnerabilities detected on the network.

2. Description of the Related Art

Computer security is a constant concern. An enterprise network, such as a network operated by a business, school, or government agency, is under continuous threat of attack. Malicious entities frequently attempt to compromise the network and perform malicious tasks such as obtaining confidential information, destroying data, and taking control of networked computers for use in subsequent attacks. The entities launch their attacks from a variety of locations. Some attacks come from the Internet or other public networks to which the enterprise network is connected. Other attacks come from within the enterprise network itself.

A network administrator is tasked with maintaining security on the enterprise network. There are a variety of tools and techniques that the administrator can use to secure the network. For example, the administrator can use a firewall to restrict access to the enterprise network. Likewise, the administrator can use network scanning tools to profile the hosts on the enterprise network and identify known vulnerabilities that are present. The administrator can review the list of vulnerabilities, and then remediate them by patching the affected hosts, reconfiguring the firewall, or taking other steps.

A problem with existing network scanning tools is that they often report an extremely large list of vulnerabilities. A large enterprise network might contain thousands of network hosts, and each host is likely to have multiple potential vulnerabilities. The existing network scanning tools can prioritize the vulnerabilities in order to allow the administrator to identify and remedy the critical ones. However, even then, there might be too many critical vulnerabilities for the administrator to address effectively. Further, sometimes the scanning tools prioritize incorrectly. For example, a tool might prioritize a vulnerability as "critical" even though it is located behind a firewall that prevents it from being accessed. Therefore, there is a need in the art for a way to more effectively prioritize vulnerabilities detected on an enterprise network.

BRIEF SUMMARY OF THE INVENTION

The above need is met by a method, system, and computer program product that prioritizes vulnerabilities on an enterprise network based, in part, on accessibility.

There are one or more threat zones associated with the enterprise network. For example, a firewall may create two threat zones for the network, one internal to the firewall and one external to it. In one embodiment, there are multiple device profilers on the network dispersed among the different threat zones.

A device profiler in the first threat zone profiles the hosts on the network and identifies the services running on the hosts. The device profiler associates vulnerabilities with the services. A device profiler in the second threat zone receives the list of hosts, services, and/or vulnerabilities and attempts to connect to the services having the vulnerabilities. Oftentimes, some services are accessible from the second threat zone while others are inaccessible.

A risk module receives the results of the accessibility determinations and calculates the risks associated with the vulnerabilities. In one embodiment, the risk module calculates risk based on a severity metric assigned to a vulnerability, an asset value assigned to the host having the vulnerability, and threat level metrics assigned to the threat zones from which the vulnerability is accessible. A reporting module generates reports that prioritize the vulnerabilities based on their risks.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
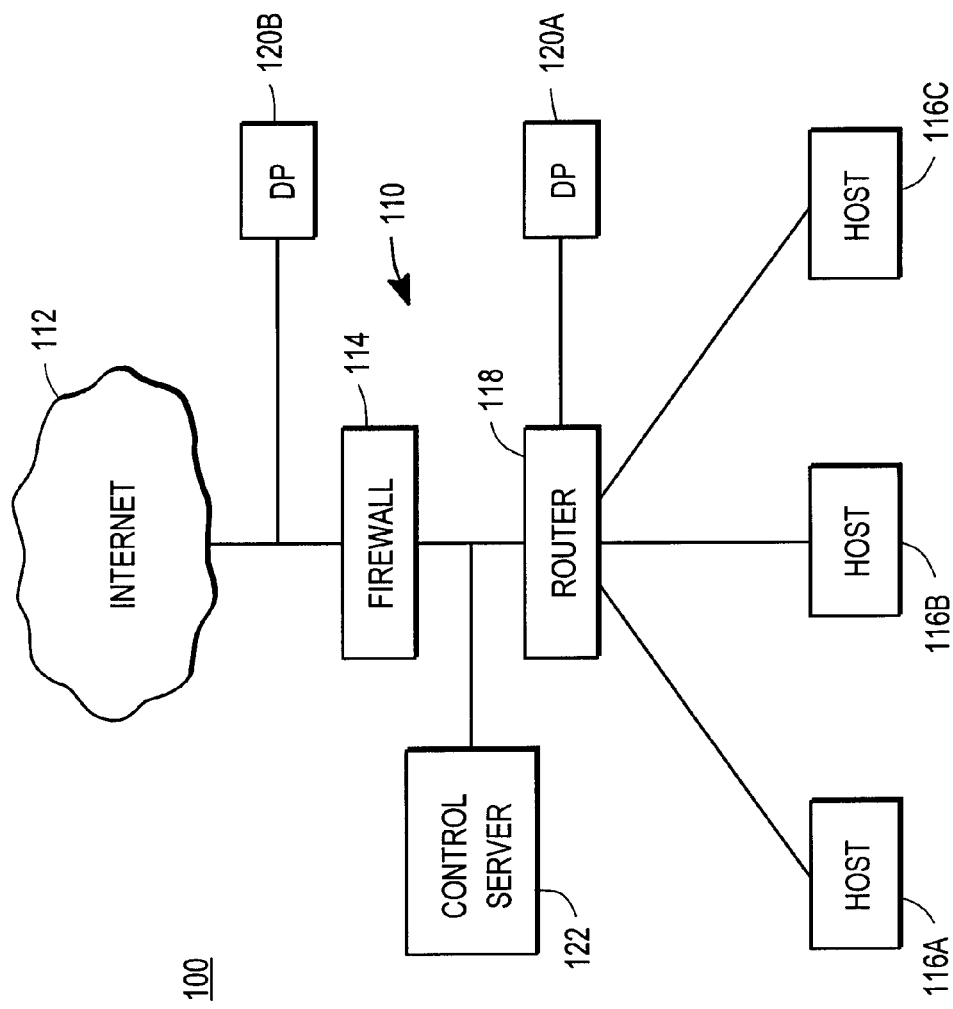
FIG. 1 is a high-level block diagram illustrating an example of a network environment where accessibility is utilized to prioritize security vulnerabilities according to one embodiment.

FIG. 1 is a high-level block diagram illustrating an example of a network environment 100 where accessibility is utilized to prioritize security vulnerabilities according to one embodiment. The environment 100 includes an enterprise network 110 connected to the Internet 112 by a firewall 114. The enterprise network 110 represents a typical network that is used by an enterprise such as a business, school, government agency, or other organization. A network administrator is a person or group of people responsible for maintaining the enterprise network 110.

As is known in the art, the Internet 112 is a publicly-accessible network. In some embodiments, the enterprise network is coupled to other networks instead of, or in addition to, the Internet 112.

The enterprise network 110 and Internet 112 represent data communication pathways among the other entities described herein. In one embodiment, the networks 110, 112 use standard communications technologies and/or protocols. Thus, the networks 110, 112 can include links using technologies such as Ethernet (IEEE 802.3), Wi-Fi (IEEE 802.11x), integrated services digital network (ISDN), digital subscriber line (DSL), asynchronous transfer mode (ATM), etc. Similarly, the networking protocols used on the networks 110, 112 can include multiprotocol label switching (MPLS), the transmission control protocol/Internet protocol (TCP/IP), the User Datagram Protocol (UDP) the Internet Control Message Protocol (ICMP), the hypertext transport protocol (HTTP), the simple mail transfer protocol (SMTP), the file transfer protocol (FTP), etc. Data exchanged over the network 110, 112 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

FIG. 1 and the other figures use like reference numerals to identify like elements. A letter after a reference numeral, such as "116A," indicates that the text refers specifically to the element having that particular reference numeral. A reference numeral in the text without a following letter, such as "116," refers to any or all of the elements in the figures bearing that reference numeral (e.g. "116" in the text refers to reference numerals "116A," "116B" and/or "116C" in the figures).

The enterprise network 110 includes three hosts 116A, 116B, 116C. These hosts 116 represent the many network-connected devices that are present on a typical enterprise network. A host 116 can be, for example, a desktop or laptop computer, a rack mounted computer, a printer or scanner, an Internet Protocol (IP)-based telephone, a network appliance for performing specialized functions, or a media player. There might be hundreds or thousands of hosts coupled to the enterprise network 110, but only three are shown in FIG. 1 for purposes of clarity.

The enterprise network 110 also includes a router 118 that routes data on the network. The illustrated router 118 represents one of the many routers that are likely to be present in a typical enterprise network 110. Depending upon the embodiment and/or location of the router 118, the router can be located entirely within the enterprise network 110 or can serve as a gateway to the Internet 112 and/or another network. The router 118 is a type of host 116 for purposes of this discussion, but is described separately because it performs a dedicated function.

The firewall 114 is located between the router 118 and the Internet 112 and limits access to the networks according to a security policy. The security policy is configured by the administrator and stored by the firewall as one or more configuration files. In one embodiment, the firewall 114 restricts the types of traffic that can enter the enterprise network 110 from the Internet 112. For example, the firewall 114 can allow traffic only on certain ports (e.g., on certain data connections, such as a TCP socket or UDP datagram), and block traffic on other ports. An enterprise network 110 can have multiple firewalls 114 at different network locations, and the illustrated firewall is merely representative. Further, the firewall 114 can be a standalone device or combined with a device providing other functionality. For example, in one embodiment the firewall 114 and router 118 are combined into a single device. For purposes of this discussion, the firewall 114 is also considered a network host 116.

In one embodiment, each host 116 has an asset value that is assigned by the network administrator. The asset value is a metric representing the business value of the host 116 and serves to differentiate the relative importance of the different hosts. For example, a server that holds critical financial data for the enterprise is likely to have a greater asset value than a printer. Depending upon the embodiment, the asset value can be expressed in a number of different ways. For example, the asset value can be represented as a dollar amount, e.g., $200. Likewise, the asset value can be represented as the person-hours invested in the host, e.g., 100 hours.

In an embodiment where the enterprise network 110 utilizes TCP/IP, each host 116 is located at an IP address. Moreover, each host has a set of ports through which it can exchange data with other entities on the network. Each host 116 provides zero or more services that are accessible via its ports. For example, a host 116 can execute an application that provides a web server. The web server provides a service that responds to HTTP requests received on TCP port 80. Similarly, a host 116 can run instant messaging (IM) and/or music sharing applications that provide services on one or more ports to enable the applications to function. A host 116 that is a printer may execute an application that allows connections on one or more ports for sending data to the printer. An unsecured or improperly-configured host 116 might run a large number of services and have many open ports.

Each service provided by a host 116 has zero or more vulnerabilities. Generally, a "vulnerability" is a weakness in the service's security procedures that allows the service or host to be exploited. Oftentimes, there are many potential vulnerabilities associated with a service. Whether a service possess a particular vulnerability depends upon the version and/or patch level of the software providing the service, among other factors. For example, a host 116 executing a particular version and patch level of a web serving application might be susceptible to a buffer overflow exploit that allows an attacker to gain control of the host. Similarly, a host 116 executing a Trojan Horse program can have an open port through which a malicious actor can control the computer.

FIG. 1 illustrates two device profilers 120A, 120B. Generally, the device profilers 120 detect vulnerabilities on the hosts. Embodiments of the environment 100 have one or more device profilers 120. In FIG. 1, one of the two device profilers 120A is connected to the router 118. This device profiler 120A represents a profiler that is internal to the enterprise network 110, e.g., on the enterprise network side of the firewall 114. The other device profiler 120B, in contrast, is illustrated as having the same orientation as the Internet 112 with respect to the firewall 114. This device profiler 120B represents a profiler that is external to the enterprise network 110, e.g., on the Internet side of the firewall 114.

Since network traffic from the internal device profiler 120A is not restricted by the firewall 114, the internal profiler is expected to have greater accessibility to the enterprise network hosts 116 than is the external profiler 120B. "Accessibility" refers to the ability of the device profiler 120 to access a resource of a host. For example, the internal device profiler 120A might be able to access a service running on a particular port of a host 116, while the firewall 114 prevents the external device profiler 120B from accessing the same host and/or service.

The location of a device profiler 120, and the accessibility to the hosts 116 on the enterprise network 110 from that location, define a "threat zone." In FIG. 1, the internal device profiler 120A is within a first threat zone generally comprising the network space on the router side of the firewall 114, and the external device profiler 120B is within a second threat zone generally comprising the network space on the Internet side of the firewall. In an ideal embodiment, there is a device profiler 120 at each different threat zone associated with the enterprise network 110. Thus, there are multiple device profilers 120 at multiple locations within and without the enterprise network 110.

The administrator can assign a "threat level" to each threat zone. The threat level is a metric indicating the relative likelihood that a threat will emanate from that threat zone. For example, the threat zone on the enterprise network side of the firewall 114 is likely to have a lower threat level than the threat zone on the Internet side of the firewall. Access to the enterprise network is likely controlled by physical security such as walls, locks, closed circuit cameras, guards, etc., and there is a relatively low likelihood that a person will attack the network from within. In most environments, attacks are more likely to be launched from anonymous attackers on the Internet.

In one embodiment, the internal device profilers 120A collectively scan the hosts 116 on the network to compile a set of all vulnerabilities present on the network. The vulnerability data are shared with the external device profilers 120B, and the external profilers attempt to access the enterprise network vulnerabilities. This scanning produces a set of data describing which vulnerabilities are accessible from which threat zones.

A control server 122 coordinates the operation of the device profilers 120 and receives the results of the vulnerability scans. In one embodiment, the control server 122 generates reports prioritizing the vulnerabilities of the enterprise network 110. Depending upon the report, the vulnerabilities can be prioritized based on the asset values of the hosts having the vulnerabilities, the threat levels of the threat zones from which the vulnerabilities can be accessed, the inherent risk associated with the vulnerabilities, and/or other factors. Thus, the control server 122 might prioritize a relatively low-risk vulnerability that is accessible from a threat zone having a high threat level as a higher priority than a high-risk vulnerability that is accessible from only low-threat zones. This prioritization based on accessibility provides a network administrator with an accurate picture of the risks associated with the enterprise network 110.

Figure 2:
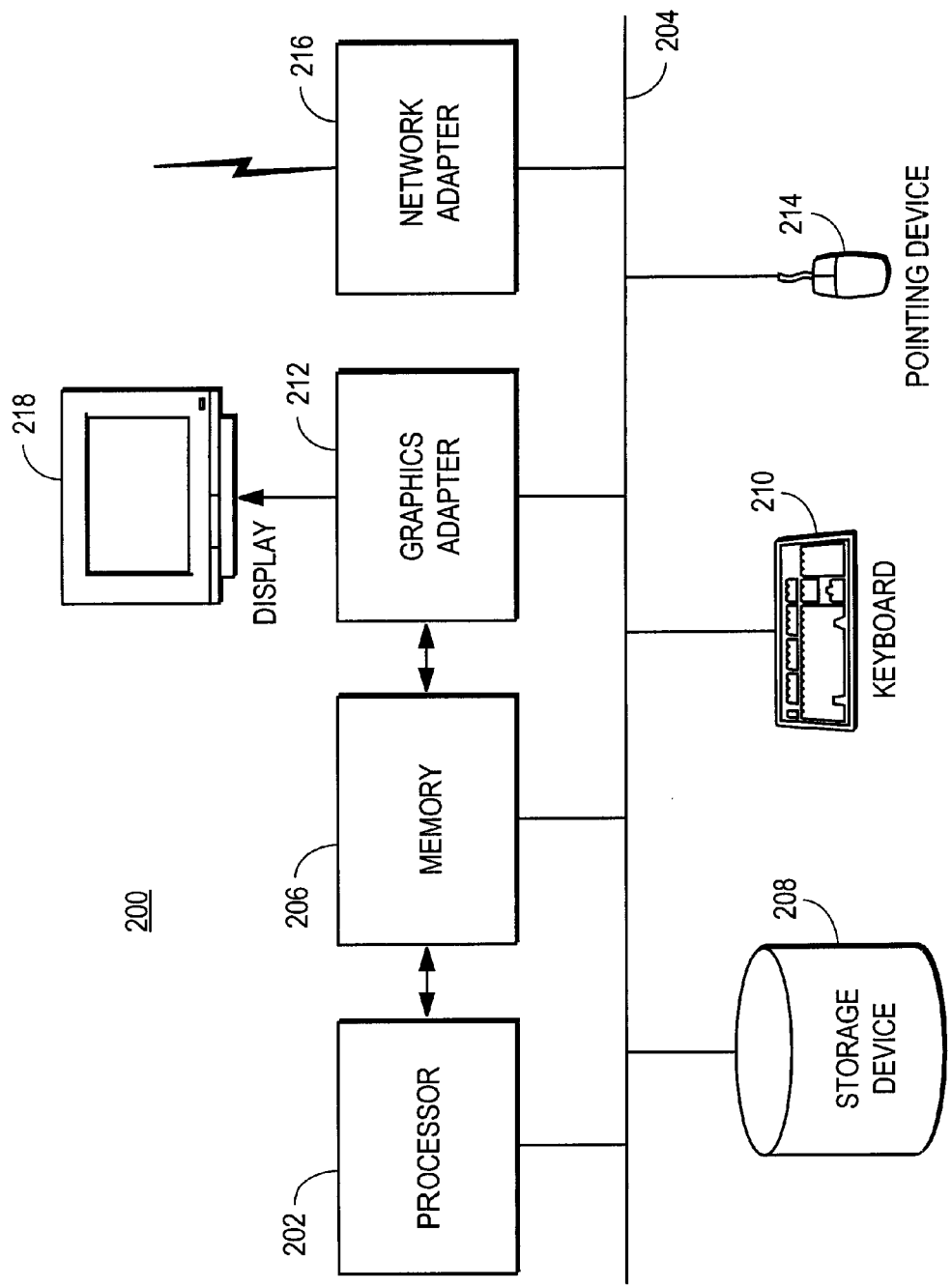
FIG. 2 is a high-level block diagram illustrating a functional view of a typical computer for use as one of the entities illustrated in the environment of FIG. 1 according to one embodiment.

FIG. 2 is a high-level block diagram illustrating a functional view of a typical computer 200 for use as one of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer 200 to a network.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power required by the entity. For example, a host 116 operating as a web server typically requires more processing power than a host operating as an end-user workstation. Likewise, a computer 200 functioning as a firewall 114, router 118, device profiler 120, or other host 116 often lacks components such as a display, keyboard, and/or pointing device.

Figure 3:
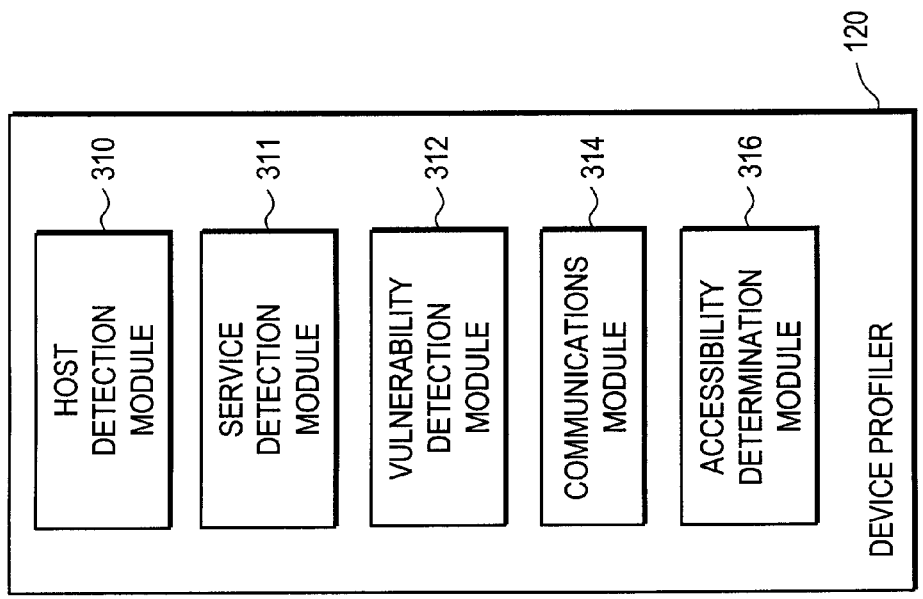
FIG. 3 is a high-level block diagram illustrating functional modules within a device profiler according to one embodiment.

FIG. 3 is a high-level block diagram illustrating functional modules within a device profiler 120 according to one embodiment. Other embodiments of the device profiler 120 may contain different and/or additional modules than the ones shown in FIG. 3. Further, other embodiments may distribute the functionalities among the modules in a different manner than shown in the figure. Not every device profiler 120 need contain every module shown in FIG. 3.

Turning now to the device profiler of FIG. 3, a host detection module 310 identifies the network hosts 116 that are accessible to the device profiler. At a high level, the host detection module 310 sends IP packets to addresses within the enterprise network's logical address space to determine whether hosts 116 reside there. In one embodiment, the service detection module 311 sends TCP and UDP service request packets, and/or ICMP echo-request packets to ports within the network address space. If any of these packets receives a reply, then a host 116 resides at the network address to which the packet was sent.

A service detection module 311 attempts to determine the services present on each detected host 116. In one embodiment, the service detection module 311 sends additional TCP and/or UDP packets to the ports of the host 116 to discover whether and what services are present on the ports. If the service detection module 311 finds that a service is running, it attempts to determine additional details about the service, such as the version number and patch level of the software providing the service. Additional information about the functionality of the host and service detection modules 310, 311 is found in U.S. patent application Ser. No. 10/456,837, filed Jun. 6, 2003 and entitled "Network Security System," which is hereby incorporated herein by reference.

A vulnerability detection module 312 identifies the vulnerabilities that are present at each accessible host 116. In one embodiment, the vulnerability detection module 312 contains or references a table, tree, and/or other data structure that associates known vulnerabilities with particular versions and/or patch levels of services running on the hosts. For example, assume the service detection module 311 determines that port 80 of a host 116 is executing version 5 of the Internet Information Services (IIS) web server, and that certain patches have been applied to the software. The vulnerability detection module 312 utilizes the data structure to identify the vulnerabilities that are known to be associated with that version and patch level of IIS, and associates those vulnerabilities with port 80 of the host 116. In one embodiment, the vulnerability detection module 312 associates a "severity" with each vulnerability. The "severity" is a metric that indicates the relative danger presented by the vulnerability. Additional information about the functionality of the vulnerability detection module 312 is found in U.S. patent application Ser. No. 10/456,837.

A communications module 314 exchanges the host and vulnerability information with the other device profilers 120. In one embodiment, the communications module 314 provides the host and vulnerability information to the control server 122. Additionally, the communications module 314 requests and receives other host and vulnerability information from the control server 122. In another embodiment, the communications module 314 directly communicates with the other device profilers 120.

An accessibility determination module 316 determines whether a service, and hence, the service's vulnerabilities, are accessible from the threat zone of the device profiler 316. In one embodiment, the accessibility determination module 316 uses the functionality of the service detection module 311 to attempt to connect to a particular service on a host 116. This functionality is used by the external device profilers 120B in some embodiments to check accessibility to services profiled by the internal device profilers 120A. For example, if an internal device profiler 120A observes that a web server is running on port 80 of a host 116, the accessibility determination module 316 of the external device profiler 120B will attempt a TCP connection with port 80 of the host to determine whether the service is accessible. The accessibility determination module 316 records data indicating which vulnerabilities are accessible. In one embodiment, the device profiler 120 provides these data to the control server 122.

In one embodiment, the accessibility determination module 316 performs a "line of sight" analysis where it determines only whether a service is accessible from a threat zone. In another embodiment, the accessibility determination module 316 performs a "hop" analysis where it determines both whether a service is accessible, and the "hops" between the threat zone and the service. "Hops" in this context refers to the network nodes that IP packets traverse when traveling from the threat zone to the vulnerable service.

Figure 4:
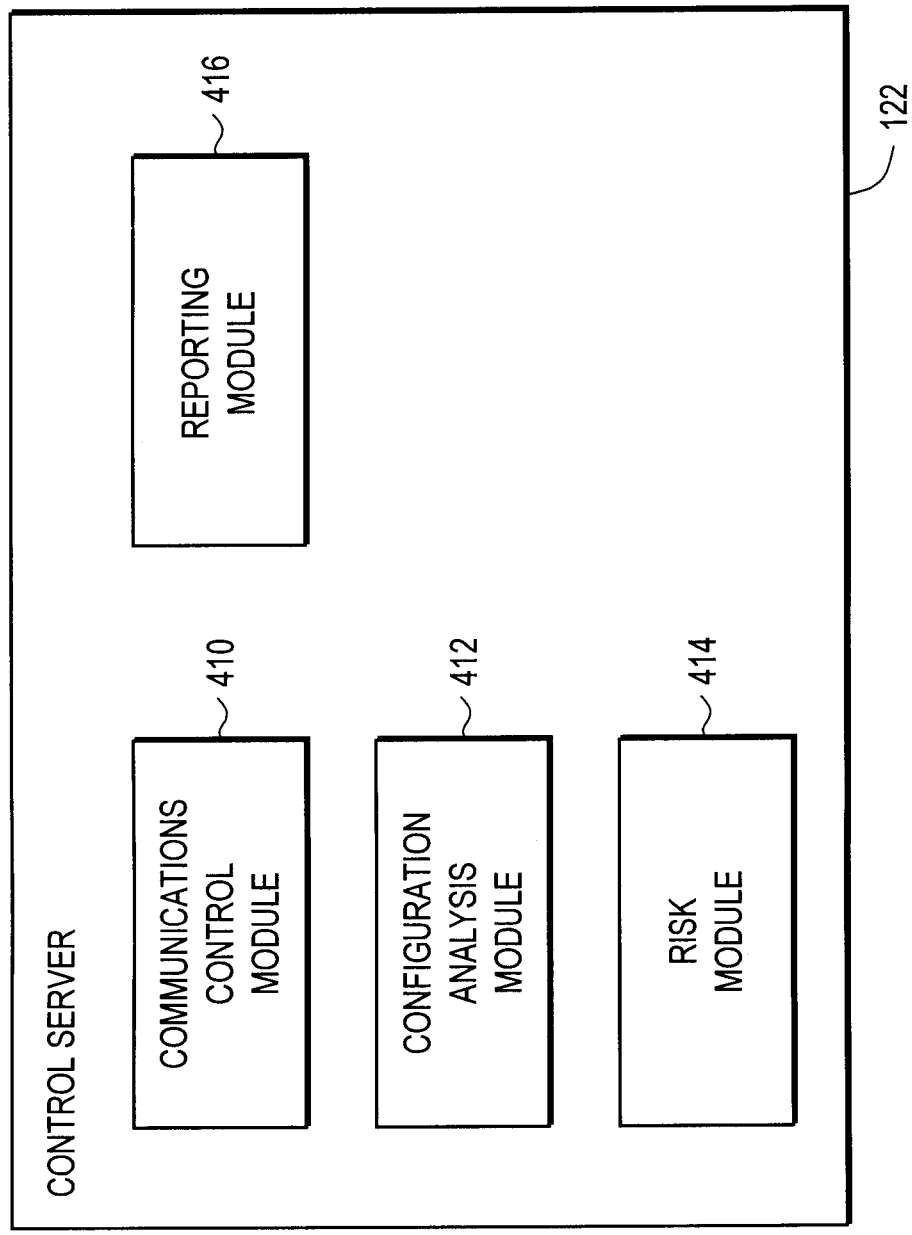
FIG. 4 is a high-level block diagram illustrating modules within the control server according to one embodiment.

FIG. 4 is a high-level block diagram illustrating modules within the control server 122 according to one embodiment. Other embodiments of the control server 122 may contain different and/or additional modules than the ones shown in FIG. 4. Further, other embodiments may distribute the functionalities among the modules in a different manner than shown in the figure.

A communications control module 410 communicates with the device profilers 120 to send and receive data and instructions. In one embodiment, the communications control module 410 provides the vulnerability information in response to requests from the device profilers 120, and receives the results of the analyses performed by the profilers' accessibility determination modules 316. The communications control module 410 makes these results available to the other modules in the control server 122.

A configuration analysis module 412 performs a vulnerability accessibility analysis by analyzing the configuration of the firewall 114, router 118, and/or other network traffic devices. This module 412 identifies the traffic devices on the enterprise network 110 and analyzes the devices' configurations to identify the unique threat zones associated with the network. The configurations describe the security policies enforced by the network traffic devices and related information. In one embodiment, the module 412 presents the administrator with a user interface that identifies the threat zones and allows the administrator to assign threat levels to the zones.

In one embodiment, the configuration analysis module 412 utilizes the configuration information to create representations of permissible data traffic flows through the network 110, and utilizes these representations to process the vulnerability data from the device profilers 120 in order to determine which services and attendant vulnerabilities are accessible from which threat zones. For example, if one of the hosts 116 has a service that resides on its port 80, and the configuration analysis module 412 determines that the firewall 114 allows connections from the Internet-side threat zone to port 80 of the host, then the module 412 declares that the service, and its vulnerabilities, are accessible from that threat zone.

In one embodiment, the configuration analysis module 412 obtains the configuration of a network traffic device directly from the device. For example, the network traffic device can have an interface, such as a simple network management protocol (SNMP) interface that allows the configuration analysis module 412 to directly read the device's configuration and runtime state. In another embodiment, the administrator causes the network traffic device to export its configuration file and/or other state information to a data repository, and the configuration analysis module 412 reads the file from the repository.

The configuration analysis module 412 serves as an alternative way to perform the function of the accessibility determination modules 316 in the device profilers 120. Thus, the accessibility determination modules 316 might be absent if the configuration analysis module 412 is present, and vice-versa.

A risk module 414 determines the risk presented by the accessible vulnerabilities. The risk can be measured for a vulnerability, for a service, and/or for a host. In one embodiment, the risk for a vulnerability accessible from a single threat zone is calculated using the formula:

$$\text{vuln\_risk} = \text{severity} * \text{threat level}$$

In this formula, "severity" is the metric representing the relative danger presented by the vulnerability. "Threat level" is the metric indicating the relative likelihood that a threat will emanate from the threat zone. In one embodiment, these two metrics might initially have unbounded values. An embodiment of the risk module 414 quantizes these two metrics to values between, and including, zero and one.

If a vulnerability is accessible from two threat zones, an embodiment of the risk module 414 creates a combined threat level using the following function:

$$\text{combine}(x_1, x_2) = x_1((1-x_1) * x_2)$$

where "$x_1$" and "$x_2$" are the respective quantized threat levels of the two threat zones. This function is generalized for the case where there are n threat zones as follows:

$$\text{combine}(x_1 \ldots) = 1 - \Pi(1-x_i)$$

where $x_1 \ldots x_n$ are the respective threat levels of the n threat zones that can access the vulnerability. This function accumulates the threat levels and gradually converges on one.

The risk module 414 utilizes the combined threat level in the risk metric formula described above, i.e.:

$$\text{vuln\_risk} = \text{severity} * \text{combine}(x_1 \ldots x_n)$$

to produce the risk for a given vulnerability (i.e., the "vuln_risk") accessible from multiple threat zones.

In one embodiment, the risk module 414 further calculates a risk for a service on a host by combining the risks of all of that service's vulnerabilities. This calculation is performed using the combine function described above, i.e.:

$$\text{service\_risk} = \text{combine}(\text{vuln\_risk}_1 \ldots \text{vuln\_risk}_n)$$

where vuln_risk represents a vulnerability risk associated with the service. The risk module 414 can further use the combine function to calculate the risk for a host (a "host_risk") by combining the service risks of the services running on that host.

In one embodiment, the risk module 414 calculates a final risk score by multiplying the coefficient (i.e., the vuln_risk, service_risk, or host_risk) by the asset value metric, e.g.:

service_risk=combine(vuln_risk$_1$ ... vuln_risk$_n$)*asset value

"Asset value" is the unbounded metric indicating the business value of the host on which the service is located. The final risk score thus represents the portion of the host's value that is deemed "at risk" due to the vulnerabilities.

To understand the behavior of the risk module 414, consider a sample line of sight accessibility determination made by the accessibility determination modules 316 and/or the configuration analysis module 412. Assume that a host 116 has a service with a vulnerability (designated V$_1$) that is accessible from two threat zones. Also assume that the accessibility data are represented as follows:

| Source | Destination |
| --- | --- |
| DP120A | V$_1$ |
| DP120B | V$_1$ |

This table indicates that device profiler 120A and device profiler 120B can both access the service having vulnerability V$_1$.

Assume that the quantized value for the threat level of the zone containing the internal device profiler 120A (DP120A) is 0.4, and the value for the threat level of the zone containing the external device profiler 120B (DP120B) is 0.5. Also assume that the severity metric for V$_1$ is 0.3, and the asset value for the host 116 is 100 (e.g., $100). The risk metric for the service 116 is calculated as:

combine(x,y)=0.5+((1−0.5)*0.4)=0.7 risk=0.7*0.3*100=21.

Thus, the risk associated with the service 116 is 21.

A reporting module 416 generates reports based on the output of the risk module 414 and/or other data collected by the control server 122 and/or device profilers 120. These reports enable the network administrator to evaluate the risks present on the enterprise network 110 and provide guidance on which vulnerabilities to remediate in order to decrease the risk. The reporting module 416 can generate multiple types of reports depending upon options selected by the network administrator, whether the report is based on line of sight and/or hop analyses, and/or other factors.

In one embodiment, the reporting module 416 generates a report ranking the vulnerabilities, services, and/or hosts in decreasing order of risk. This type of report effectively prioritizes the ranked items based on risk. Further, the ranked items can also be sorted based on vulnerability, services, threat zones, and/or hosts. For example, the reporting module 416 can produce a report identifying the hosts 116 that are at risk of attack from a particular threat zone.

In some embodiments, the reports generated by the reporting module 416 are provided to additional network security devices through automated and/or manual processes. For example, the reporting module 416 can send the ranked list of vulnerabilities to a traffic monitoring device that scans for network traffic containing exploits of the vulnerabilities. The traffic monitoring device utilizes the ranked list to prioritize the vulnerabilities for which it monitors.

In some embodiments, the reporting module 416 generates an alert to the administrator if the reporting module encounters a vulnerability, service, and/or host having a risk metric that exceeds a threshold. For example, the administrator can configure the reporting module 416 to broadcast a warning message, send an email or page, and/or make a phone call when it encounters a risk metric above a specified threshold. The administrator can quickly respond to the alert and remediate the vulnerability before any malfeasance occurs.

In an embodiment where the accessibility determination modules 316 perform a hop analysis in addition to, or instead of, the line of sight analysis, the reporting module 416 can generate a report graphically indicating the paths from the threat zones to the services having the vulnerabilities. The administrator can view this report and quickly identify ways to reconfigure the intermediate devices to mitigate the vulnerabilities. This type of mitigation may be easier than other techniques for responding to vulnerabilities, such as patching the hosts 116.

To understand how the reporting module 416 utilizes and displays a hop analysis, consider sample hop information as follows:

DP120A→R118→V2
DP120B→FW114→R118→V2

This hop information indicates that device profiler 120A accesses vulnerability V2 of a service by passing through router 118. In addition, device profiler 120B accesses vulnerability V2 by passing through firewall 114 and router 118.

Figure 5:
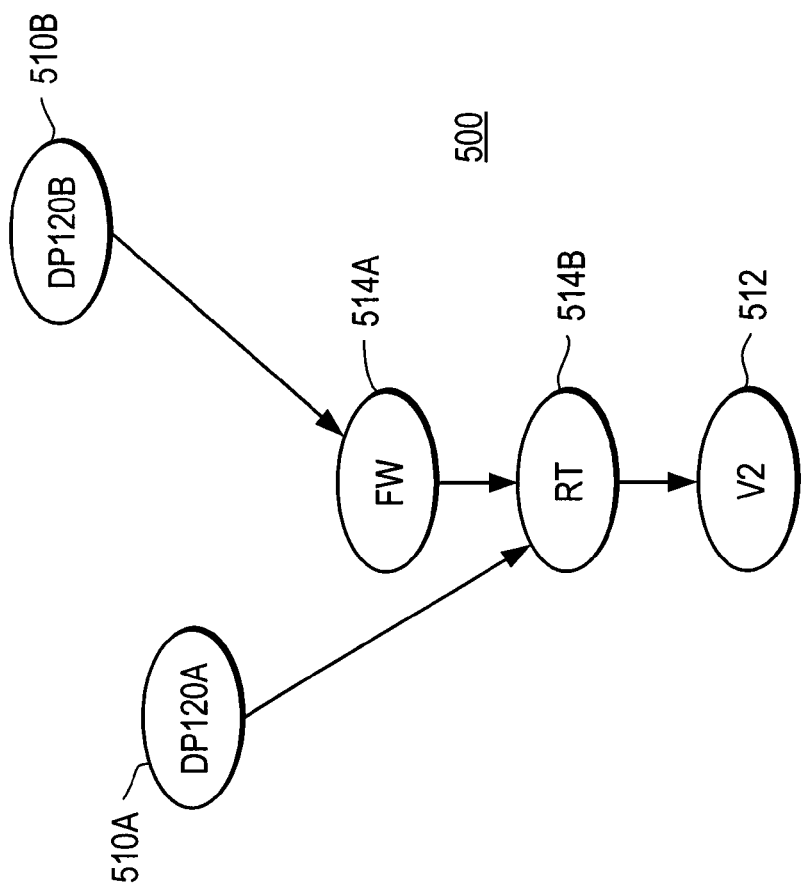
FIG. 5 is a diagram illustrating a graphical representation of hop information produced by the reporting module according to one embodiment.

FIG. 5 is a diagram illustrating a graphical representation of the sample hop information produced by the reporting module 416 according to one embodiment. The graphical representation is an inverted tree graph 500, where the device profilers 120 are represented by the leaf nodes 510, the vulnerability is represented as the root node 512, and the intermediate nodes 514 represent intermediate devices. Upon viewing this representation, the administrator will recognize that it might be possible to mitigate the vulnerability by changing the security policy of the router 118 represented by node 514B (assuming for purposes of this example that the router can enforce a security policy).

In one embodiment, the graphical representation produced by the reporting module 416 is dynamic. The reporting module 416 allows the administrator to simulate changes to the network, and the graphical representation updates in real-time to show the effects of the changes. Further, in one embodiment the reporting module 416 performs an automated analysis to identify the most common paths or nodes used to access the vulnerabilities. These common paths are denoted in the graphical representation by color or via another technique.

Figure 6:
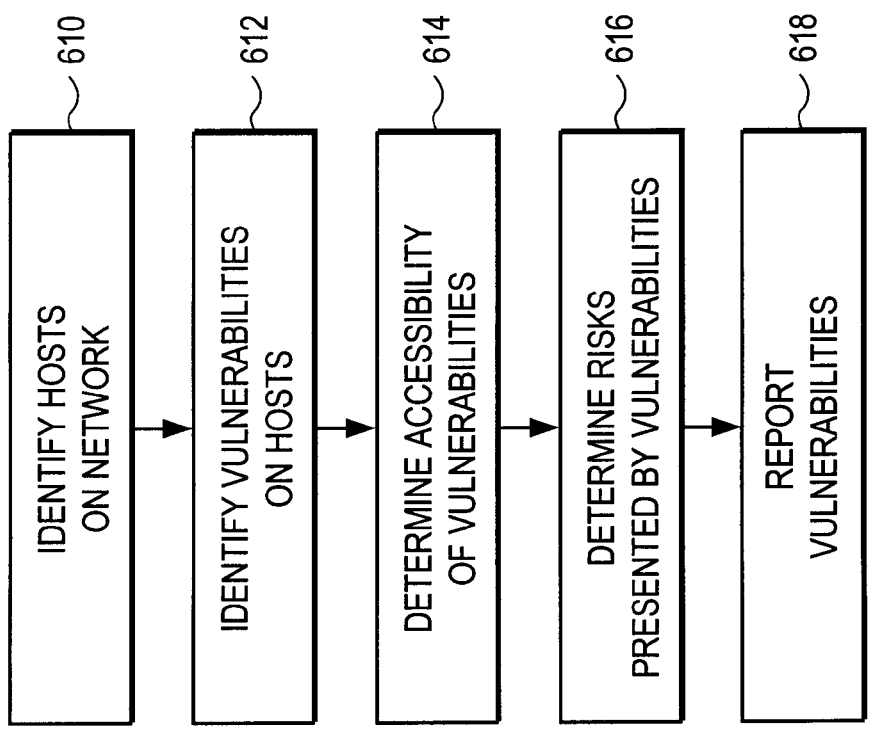
FIG. 6 is a flowchart illustrating steps performed to prioritize vulnerabilities on the enterprise network according to one embodiment.

FIG. 6 is a flowchart illustrating steps performed to prioritize vulnerabilities of services on the enterprise network 110 according to one embodiment. Those of skill in the art will recognize that similar steps can be used to prioritize services, hosts, and/or other items. Other embodiments perform different and/or additional steps than the ones shown in the figure. Moreover, other embodiments perform the steps in different orders.

Initially, the device profilers 120 identify 610 the hosts 116 on the enterprise network 110. In addition, the device profilers 120 identify 612 the services present on the hosts, and the vulnerabilities possessed by those services. In one embodiment, this profiling is performed by device profilers 120 in a first threat zone.

In one embodiment, data describing the profiled hosts and services on the enterprise network 110 are shared with the device profilers 120 in other zones via the control server 122. These device profilers 120, in turn, determine 614 whether the vulnerabilities (i.e., the services having the vulnerabilities) are accessible from their respective threat zones. Some vulnerabilities are accessible while others may be inaccessible.

The risks presented by the vulnerabilities are determined 616. In one embodiment, the risks are determined by calculating a risk metric for each vulnerability. This metric is based on the severity of the vulnerability and the threat levels of the threat zones from which the vulnerability is accessible and in one embodiment the value of the asset (i.e., host) on which the service having the vulnerability resides. These risks are reported 618 to the network administrator. In one embodiment, the risks are reported as a prioritized list, where vulnerabilities having the highest risks have the highest priorities. The administrator can use this list in conjunction with other sortings and groupings to identify the vulnerabilities to remediate first.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of prioritizing security vulnerabilities in an enterprise computer network having an address space accessible from a plurality of threat zones, comprising:
    profiling hosts in the address space of the enterprise computer network by sending packets to addresses within the address space using a first device profiler located in a first threat zone of the network to identify vulnerabilities of the hosts accessible from the first threat zone;
    profiling the hosts in the address space of the enterprise computer network by sending packets to the addresses within the address space using a second device profiler located in a second threat zone of the network to identify vulnerabilities of the hosts accessible from the second threat zone;
    assigning a first threat level metric to the first threat zone and a second threat level metric to the second threat zone, the first threat level metric indicating a relative likelihood that a threat will emanate from the first threat zone, and the second threat level indicating a relative likelihood that a threat will emanate from the second threat zone;
    for an identified vulnerability accessible from both the first and second threat zones, calculating a risk associated with the identified vulnerability using the first and second threat level metrics;
    for a service affected by the identified vulnerability, calculating a risk associated with the service using the risk associated with the identified vulnerability and one or more risks associated with other vulnerabilities that affect the service; and
    prioritizing the identified vulnerability relative to other vulnerabilities using the calculated risk.

2. The method of claim 1, wherein prioritizing the vulnerability relative to other vulnerabilities of the hosts comprises:
    prioritizing the vulnerability of the host accessible from the first and second threat zones over a second vulnerability of the host that is inaccessible from the second threat zone;
    generating a ranked list of the vulnerabilities responsive to the priorities of the vulnerability and the second vulnerability; and
    sending the ranked list of the vulnerabilities to a network security device, the network security device adapted to prioritize processing of the vulnerabilities based on the ranked list.

3. The method of claim 1, wherein profiling the hosts in the address space of the enterprise computer network by sending packets to the addresses within the address space using a second device profiler comprises:
    identifying a service on a host in the first threat zone of the network with which the vulnerability is associated;
    attempting to connect to the service on the host by the second device profiler in the second threat zone; and
    responsive to connecting to the service of the host with which the vulnerability is associated, determining that the vulnerability is accessible from the second threat zone of the network.

4. The method of claim 1, wherein calculating the risk associated with the identified vulnerability comprises:
    assigning a threat level metric to each threat zone from which the vulnerability of the host is accessible;
    assigning an asset value metric to the host;
    assigning a severity metric to the vulnerability; and
    calculating the risk associated with the vulnerability responsive to the threat level metrics, the asset value metric, and the severity metric.

5. The method of claim 1, further comprising:
    analyzing a configuration of a network traffic device by reading the configuration directly from the device to identify vulnerabilities of the hosts accessible from the second threat zone.

6. The method of claim 1, further comprising:
    identifying hop information describing a path from the second threat zone to the identified vulnerability of the host; and
    graphically representing the hop information.

7. The method of claim 1, wherein the method further comprises, for the identified vulnerability accessible from both the first and second threat zones, calculating a third threat level metric that is a function of the first threat level and the second threat level and represents a combined threat level for the first and second threat zones, and wherein the calculating the risk associated with the identified vulnerability accessible from the first and second threat zones comprises using the third threat level metric.

8. A system for prioritizing security vulnerabilities in an enterprise computer network having an address space accessible from a plurality of threat zones, comprising:
    a first device profiler located in a first threat zone of the network for profiling hosts in the address space of the enterprise computer network by sending packets to addresses within the address space to identify vulnerabilities of the hosts accessible from the first threat zone;
    a second device profiler located in a second threat zone of the network for profiling hosts in the address space of the enterprise computer network by sending packets to addresses within the address space to identify vulnerabilities of the hosts accessible from the second threat zone;
    a risk module for: (1) assigning a first threat level metric to the first threat zone and a second threat level metric to the second threat zone, the first threat level metric indicating a relative likelihood that a threat will emanate from the first threat zone and the second threat level indicating a relative likelihood that a threat will emanate from the second threat zone; (2) for calculating a risk associated with an identified vulnerability accessible from the first and second threat zones using the first and second threat level metrics; and (3) for calculating a risk associated with a service affected by the identified vulnerability using the risk associated with the identified vulnerability and one or more risks associated with other vulnerabilities that affect the service; and a reporting module for prioritizing the vulnerability relative to other vulnerabilities responsive to the calculated risk.

9. The system of claim 8, wherein the reporting module is further configured for:
prioritizing the vulnerability of the host accessible from the first and second threat zones over a second vulnerability of the host inaccessible from the second threat zone;
generating a ranked list of the vulnerabilities responsive to the priorities of the vulnerability and the second vulnerability; and
sending the ranked list of the vulnerabilities to a network security device, the network security device adapted to prioritize processing of the vulnerabilities based on the ranked list.

10. The system of claim 8, wherein profiling the hosts in the address space of the enterprise computer network by sending packets to the addresses within the address space using a second device profiler comprises:
identifying a service on a host in the first threat zone of the network with which the vulnerability is associated;
attempting to connect to the service on the host; and
responsive to connecting to the service on the host with which the vulnerability is associated, determining that the vulnerability is accessible from the second threat zone of the network.

11. The system of claim 8, wherein calculating the risk associated with the identified vulnerability comprises:
assigning a threat level metric to each threat zone from which the vulnerability of the host is accessible;
assigning an asset value metric to the host;
assigning a severity metric to the vulnerability; and
calculating the risk associated with the vulnerability responsive to the threat level metrics, the asset value metric, and the severity metric.

12. The system of claim 8, further comprising:
a configuration analysis module for analyzing a configuration of a network traffic device by reading the configuration directly from the device to identify vulnerabilities of the hosts accessible from the second threat zone.

13. The system of claim 8, wherein the reporting module is further adapted to receive hop information describing a path from the second threat zone to the identified vulnerability of the host and to graphically represent the hop information.

14. The system of claim 8, wherein the risk module is further for calculating a third threat level metric when an identified vulnerability is accessible from the first and second threat zones, the third threat level being a function of the first threat level and the second threat level and representing a combined threat level for the first and second threat zones, and calculating the risk associated with the identified vulnerability accessible from the first and second threat zones using the third threat level.

15. A computer program product stored on a non-transitory computer readable storage medium, the computer program product for prioritizing security vulnerabilities in an enterprise computer network having an address space accessible from a plurality of threat zones, comprising:
a first vulnerability detection module adapted to be located in a first threat zone of the network for profiling hosts in the address space of the enterprise computer network by sending packets to addresses within the address space to identify vulnerabilities of the hosts accessible from the first threat zone;
a second vulnerability detection module adapted to be located in a second threat zone of the network for profiling hosts in the address space of the enterprise computer network by sending packets to addresses within the address space to identify vulnerabilities of the hosts accessible from the second threat zone;
a risk module: (1) for assigning a first threat level metric to the first threat zone and a second threat level metric to the second threat zone, the first threat level metric indicating a relative likelihood that a threat will emanate from the first threat zone and the second threat level indicating a relative likelihood that a threat will emanate from the second threat zone; (2) for calculating a risk associated with an the identified vulnerability accessible from the first and second threat zones using the first and second threat level metrics; and (3) for calculating a risk associated with a service affected by the identified vulnerability using the risk associated with the identified vulnerability and one or more risks associated with other vulnerabilities that affect the service; and
a reporting module for prioritizing the vulnerability relative to other vulnerabilities responsive to the calculated risk.

16. The computer program product of claim 15, wherein the reporting module is further configured for:
prioritizing the vulnerability of the host accessible from the first and second threat zones over a second vulnerability of the host inaccessible from the second threat zone;
generating a ranked list of the vulnerabilities responsive to the priorities of the vulnerability and the second vulnerability; and
sending the ranked list of the vulnerabilities to a network security device, the network security device adapted to prioritize processing of the vulnerabilities based on the ranked list.

17. The computer program product of claim 15, wherein profiling hosts in the address space of the enterprise computer network by sending packets to addresses within the address space to identify vulnerabilities of the hosts accessible from the second threat zone comprises:
identifying a service on a host in the first threat zone of the network with which the vulnerability is associated;
attempting to connect to the service on the host; and
responsive to connecting to the service on the host with which the vulnerability is associated, determining that the vulnerability is accessible from the second threat zone of the network.

18. The computer program product of claim 15, wherein calculating the risk associated with the identified vulnerability comprises:
assigning a threat level metric to each threat zone from which the vulnerability of the host is accessible;
assigning an asset value metric to the host;
assigning a severity metric to the vulnerability; and
calculating a risk associated with the vulnerability responsive to the threat level metrics, the asset value metric, and the severity metric.

19. The computer program product of claim 15, further comprising:
a configuration analysis module for analyzing a configuration of a network traffic device by reading the configuration directly from the device to identify vulnerabilities of the hosts accessible from the second threat zone.

20. The computer program product of claim 15, wherein the reporting module is further adapted to receive hop information describing a path from the second threat zone to the identified vulnerability of the host and to graphically represent the hop information.

21. The computer program product of claim 15, wherein the risk module is further for calculating a third threat level metric when an identified vulnerability is accessible from the first and second threat zones, the third threat level being a function of the first threat level and the second threat level and representing a combined threat level for the first and second threat zones, and calculating the risk associated with the identified vulnerability accessible from the first and second threat zones using the third threat level.

* * * * *